US007193824B2

(12) United States Patent
Naka

(10) Patent No.: US 7,193,824 B2
(45) Date of Patent: Mar. 20, 2007

(54) METHOD AND APPARATUS FOR TESTING MAGNETIC HEAD WITH TMR ELEMENT

(75) Inventor: Hiroyuki Naka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/986,777

(22) Filed: Nov. 15, 2004

(65) Prior Publication Data

US 2005/0116721 A1 Jun. 2, 2005

(30) Foreign Application Priority Data

Nov. 27, 2003 (JP) ............................ 2003-398157

(51) Int. Cl.
*G11B 5/33* (2006.01)
*G11B 5/127* (2006.01)
(52) U.S. Cl. .............................. 360/324.2; 29/603.09; 428/811
(58) Field of Classification Search ................ 360/63, 360/66, 326
See application file for complete search history.

(56) References Cited

U.S. PATENT DOCUMENTS

| 5,440,233 | A | * | 8/1995 | Hodgson et al. ............ 360/326 |
| 5,729,410 | A | | 3/1998 | Fontana, Jr. et al. |
| 5,898,547 | A | | 4/1999 | Fontana, Jr. et al. |
| 6,195,219 | B1 | * | 2/2001 | Smith ........................... 360/66 |
| 6,820,020 | B2 | * | 11/2004 | Yokoyama et al. ........... 702/65 |
| 6,898,040 | B2 | * | 5/2005 | Jang et al. .................... 360/66 |

FOREIGN PATENT DOCUMENTS

JP          6-118126         4/1994
JP          2962234          8/1999

OTHER PUBLICATIONS

Danish Search Report dated Sep. 29, 2005 for Appln. No. 200407067-8.
Rudiger et al., "Temperature Dependent Resistance of Magnetic Tunnel Junctions as a Quality Proof of the Barrier", Journal of Applied Physics, Jun. 1, 2001, vol. 89, No. 11, pp. 7573-7575.
Kikuchi et al, "Low-Resistance Ferromagnetic Tunnel Junction", Fujitsu Science Tech. Journal 37,2, Dec. 2001, pp. 183-191.
Ishikava, Makoto, "Squid Test Structures", Sep. 2002.
Journal of Applied Physics, vol. 91, No. 7, "Dielectric Breakdown in Magnetic Tunnel Junctions Having An Ultrathin Barrier," Bryan Oliver, Qing He, Xuefei Tang, and J. Novak, Apr. 1, 2002, pp. 4348-4352.
9th Joint MMM-Intermag Conference, Pinhole Evaluation of TMR Head by Temperature Coefficient of Resistance (TCR) Measurement, H. Naka et al., (2001), 5 pgs.

* cited by examiner

*Primary Examiner*—Andrea Wellington
*Assistant Examiner*—Christopher R. Magee
(74) *Attorney, Agent, or Firm*—Pillsbury Winthrop Shaw Pittman, LLP

(57) ABSTRACT

A magnetic head testing apparatus having the function of evaluating pin holes in a tunnel barrier layer of a TMR element by a non destructive inspection is disclosed. The testing apparatus comprises a temperature control unit which sets a circumferential temperature of a TMR element, a bias electric current control unit which applies an electric current for measuring a resistance value, an element resistance measuring unit and a CPU which calculates a temperature coefficient. The CPU determines a pin hole state in the tunnel barrier layer based on the temperature coefficient.

2 Claims, 7 Drawing Sheets

US 7,193,824 B2

METHOD AND APPARATUS FOR TESTING MAGNETIC HEAD WITH TMR ELEMENT

CROSS-REFERENCE TO RELATED APPLICATIONS

This application is based upon and claims the benefit of priority from prior Japanese Patent Application No. 2003-398157, filed Nov. 27, 2003, the entire contents of which are incorporated herein by reference.

BACKGROUND OF THE INVENTION

1. Field of the Invention

The present invention relates to a magnetic head testing apparatus for testing generally a magnetic head using a tunneling magnetoresistive effect element. In particular, it relates to a technique for non destructive inspection of a tunnel barrier layer of the element.

2. Description of the Related Art

In general, a magnetic head comprising separately a reading head and a writing head, mounted on the same slider is used in a disk drive. The reading head is a head dedicated for reading a data signal recorded magnetically on a disk medium.

Recently, a GMR (giant magnetoresistive effect) element (referred also as a GMR sensor) suited for achieving a high recording density of a disk medium is used for the reading head. However, as recent magnetic heads and the like are very a problem of sensitivity deterioration of the GMR element has grown in importance.

As a countermeasure for the problem, use of a novel tunneling magnetoresistive effect (TMR) element (referred to also as a TMR sensor) as the reading head has been proposed.

Unlike the GMR element, in a TMR element, the conducting direction of the sense electric current is in the vertical direction with respect to the film surface, such that the tunneling electric current flows in the tunnel barrier layer (for example, see U.S. Pat. No. 5,729,410 and the U.S. Pat. No. 5,898,547).

The characteristics of the TMR element depend largely on the quality of the tunnel barrier layer of the extremely thin film. Particularly in the case a pin hole is present in the tunnel barrier layer, the decline of the breakdown voltage is observed (for example, see Journal of Applied Physics, Vol. 91, No. 7, 2002; P. 4348–4352, "Dielectric breakdown in magnetic tunnel junctions having an ultrathin barrier" Bryan Oliver, Qing He, Xuefei Tang, and J. Nowark (Seagate Technology LLC.)).

The "breakdown voltage" refers to the critical voltage of causing an element destruction at the time of applying the electric current stress to the TMR element stepwise. Moreover, the "pin hole" refers to a part with a free layer and a pinned layer present on the both sides of the tunnel barrier layer, contacted locally with a metal due to the interface disturbance by the film formation irregularity of the tunnel barrier layer, the stress in the process and the like.

In the case a pin hole is present in the tunnel barrier layer, since the pin hole part has a low resistance, the electric current flowing in the tunnel barrier layer is concentrated. It is confirmed that the destructive damage to the tunnel barrier layer is accelerated by the local heat generating effect resulting from the electric current concentration. Therefore, for an improvement of the reliability of the reading head using the TMR element, it is essential to test for the presence of pin holes in the tunnel barrier layer.

In general, the presence of pin holes can be confirmed by the breakdown test. However, since the test is a destructive test, it cannot be used for the screening test for the reading head (magnetic head).

BRIEF SUMMARY OF THE INVENTION

In accordance with one embodiment of the present invention, there is provided an apparatus for testing a magnetic head, capable of testing non destructively the pin hole state in a tunnel barrier layer of a TMR element.

The apparatus comprises a measuring unit which measures the resistance value of the TMR element, a calculating unit which calculates the temperature coefficient with respect to the resistance value of the TMR element based on a relationship between the resistance value and a circumferential temperature of the TMR element, and a determining unit which determines a pin hole state in a tunnel barrier layer included in the TMR element based on the temperature coefficient.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, with reference to the drawings, an embodiment of the present invention will be explained.

Figure 1:
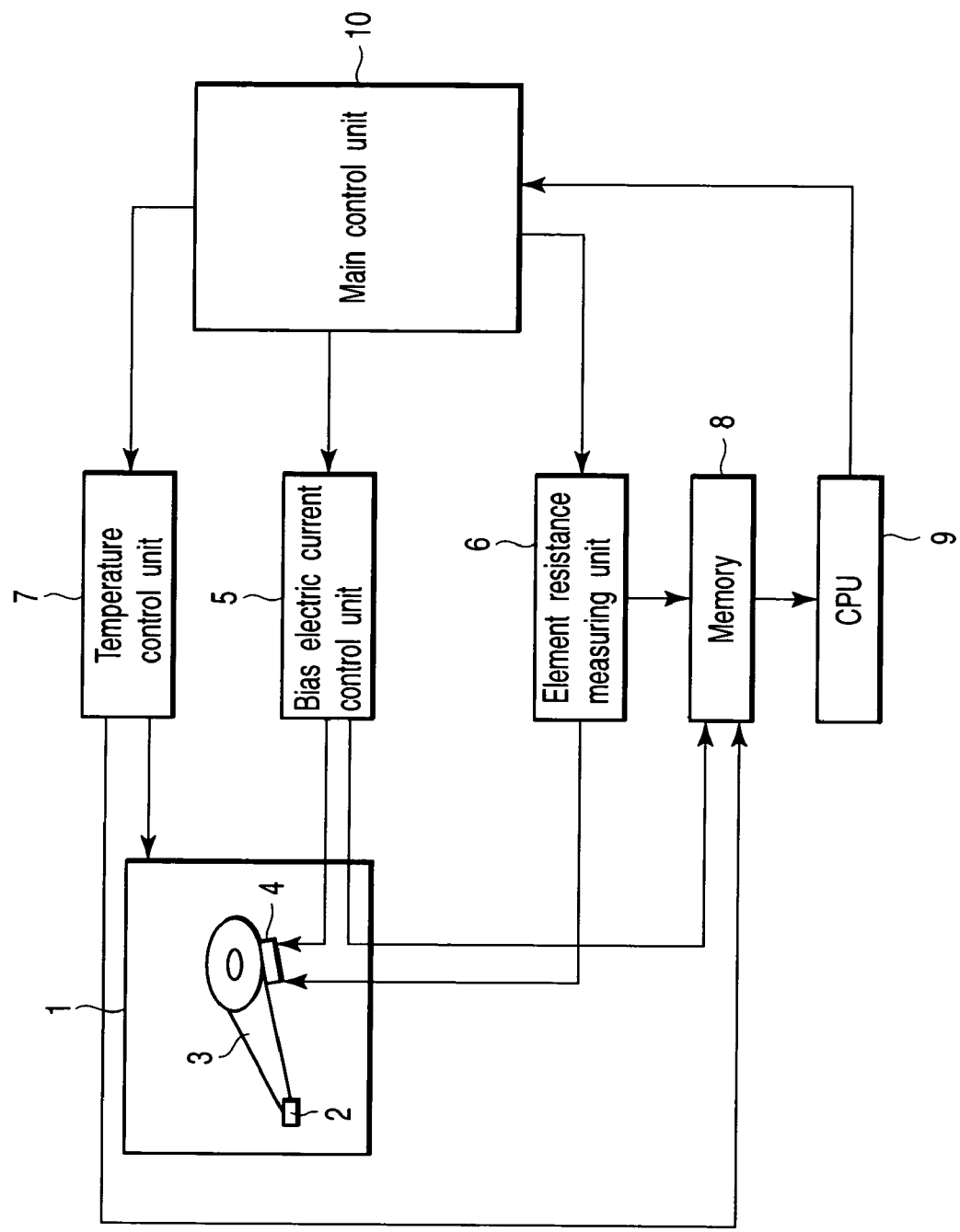
FIG. 1 is a block diagram showing a configuration of a magnetic head testing apparatus of an embodiment of the present invention.
Figure 2:
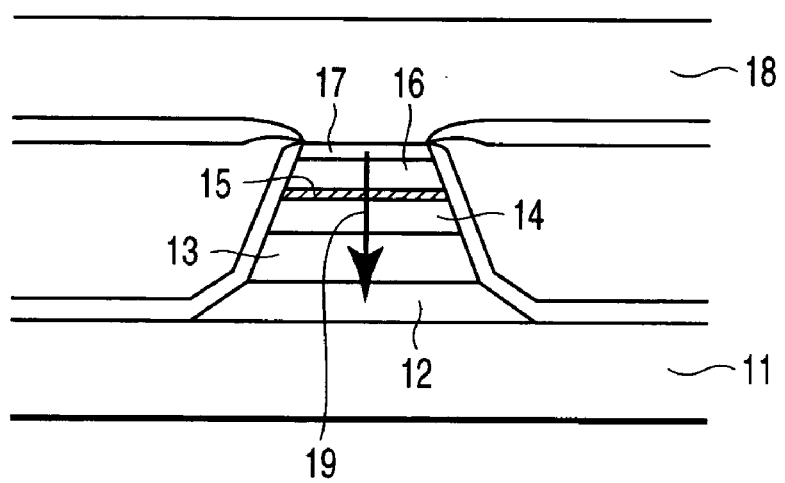
FIG. 2 is a diagram for explaining a structure of the TMR element of the embodiment.

FIG. 1 is a block diagram showing the configuration of a magnetic head testing apparatus of this embodiment. FIG. 2 is a diagram for explaining the structure of the TMR element (TMR sensor) of this embodiment.

(Structure of the TMR Element)

This embodiment relates to a magnetic head testing apparatus to be used for a magnetic head (numeral 2 in FIG. 1) comprising separately a reading head and a writing head using a TMR element, mounted on the same slider as the testing subject. The testing apparatus has the function of determining (evaluating) the pin hole state (specifically, the ratio of the presence thereof) in the tunnel barrier layer of the TMR element.

As shown in FIG. 2, the TMR element which is the testing subject of this embodiment is a sensor comprising as the basic structure a tunnel multi layer film having a first ferromagnetic layer 16 and a second ferromagnetic layer 14 laminated with a tunnel barrier layer 15 provided as the intermediate layer. FIG. 2 shows the surface facing the surface of a disk medium.

The TMR element has a first shield layer 11, a first electrode layer 12, a pinned layer 13, a pinned layer 14 as the second ferromagnetic layer, a tunnel barrier layer 15, a free layer 16 as the first ferromagnetic layer, a second electrode layer 17 and a second shield layer 18 laminated in this order.

In the case bias electric current is supplied to the second electrode layer 17, so-called tunnel electric current 19 flows from the free layer 16 as the first ferromagnetic layer to the pinned layer 14 as the second ferromagnetic layer. The TMR element is advantageous in that the sensitivity is not dependent on the element size. Moreover, owing to the presence of the extremely thin tunnel barrier layer 15 between the pinned layer 14 and the free layer 16, a high MR change ratio can be obtained.

As to the operation principle of the TMR element, in the case the bias electric current is provided in the vertical direction with respect to the film surface, the magnetization orientation of the free layer 16 is changed in the film surface according to the external magnetic field so that the conductance of the tunnel electric current 19 is changed, depending on the relative angle with respect to the magnetization orientation of the pinned layer 14 (principle of generation of the magnetic resistance effect).

Moreover, for a TMR element, the MR change ratio can be calculated theoretically from the polarizability of each ferromagnetic layer of the free layer 16 and the pinned layer 14.

(Configuration of the Testing Apparatus)

As shown in FIG. 1, the magnetic head testing apparatus of this embodiment comprises a mechanism for setting a head assembly 1 including a slider (magnetic head) 2 with a TMR element test subject as a reading head at the testing position. Here, the test subject is not limited to the slider 2, it may be provided for example in a wafer state during the production process of the TMR element. The head assembly 1 comprises the slider 2 mounted on a suspension 3 and a flexible printed circuit board (FPC) 4 connected with the TMR element.

Furthermore, the testing apparatus has a bias electric current control unit 5, an element resistance measuring unit 6, a temperature control unit 7, a memory 8, a micro processor (CPU) 9, and a main control unit (hereinafter it is referred to as a controller) 10.

The bias electric current control unit 5 is a circuit for controlling the supply of the bias electric current (electric current 19 FIG. 2) for the measurement with respect to the TMR element via the FPC 4. The element resistance measuring unit 6 is a circuit for measuring the resistance of the TMR element being supplied via the FPC 4. Specifically, the element resistance measuring unit 6 measures the resistance value of the TMR element (i.e., the resistance value of the tunnel barrier layer 15) based on the bias electric current value applied to the TMR element and the potential difference between the first electrode layer 12 and the second electrode layer 17.

The temperature control unit 7 is a device for controlling the circumferential temperature of the head assembly 1 including the TMR element as the test subject. Specifically, the temperature control unit 7 comprises specifically heating devices and controlling devices such as a heater, a laser and a constant temperature vessel.

The CPU 9 executes the testing process of the TMR element (such as the calculation process of the temperature coefficient TC to be described later). The memory stores the electric current value of the bias electric current obtained from the bias electric current control unit 5, the resistance value measured by the element resistance measuring unit 6, and the temperature value of the circumferential temperature controlled by the temperature control unit 7, or the like according to the control by the CPU 9.

The controller 10 is an apparatus for executing the control of the entire testing apparatus, which provides the final evaluation of the TMR element based on the testing result outputted from the CPU 9. Moreover, the controller 10 executes the testing processes automatically according to a predetermined sequence, utilizing a ρ-H tester, a spin stand, or the like, used as the existing magnetic sensor testing apparatus. Furthermore, the controller 10 stores in the internal memory the evaluation conditions of the temperature coefficient TC such as the bias electric current value and the setting temperature inputted by an operator before a test.

(Procedure of the Testing Process)

Hereinafter, the procedure of the testing process of the TMR element of this embodiment will be explained with reference to the flow chart of FIG. 11.

First, the controller 10 sets an initial electric current value I0 with respect to the bias electric current control unit 5 (step S1). It is preferable for the initial electric current value I0 to be 300 mV or less based on the voltage (V0=I0×R0) for avoiding destruction of the TMR element (for example, 1 mA in the case of a 300 ohm element resistance value).

Moreover, the controller 10 sets an initial temperature value T0 to the temperature control unit 7 (step S2). The definition of the temperature here is a temperature applied from the outside to the TMR element (circumferential temperature), using a heater, a laser, a constant temperature vessel, or the like. Since the initial temperature value T0 is the reference temperature, it is preferable to be set up near room temperature (for example, 30° C.) in order to restrain the load on the TMR element to a minimum level without an error with respect to the setting temperature. It is maintained until the difference of the setting temperature and the actual temperature is stabilized within the range of "±1° C.".

After the stabilization of the circumferential temperature with respect to the TMR element, the controller 10 measures the initial resistance value R0 by controlling the element resistance measuring unit 6 (step S3). The CPU 9 stores the initial resistance value R0 in the memory 8. The element resistance measuring unit 6 measures the initial resistance value R0 of the TMR element according to the initial electric current value I0 applied by the bias electric current control unit 5. Here, the measurement accuracy of the resistance is preferably 1% or less.

Next, the controller 10 sets a temperature value Tn (n=1) different from the initial temperature value T0 in the temperature control unit 7 (step S5). The setting temperature value T1 may either be higher or lower than the initial temperature value T0. However, since the higher temperature side involves the risk of the element deterioration, it is preferable to be 200° C. or less.

After the stabilization of the temperature by the temperature control unit 7, the element resistance measuring unit 6 measures the resistance value R1 of the TMR element according to the initial electric current value I0 applied by the bias electric current control unit 5 (step S6).

Hereafter, by repeating the processes of the steps S5 to S8, the controller 10 finally executes the temperature setting of the nth time and the measuring of the resistance value Rn (YES of step S8). The CPU 9 calculates the temperature coefficient TC with respect to the resistance of the TMR element, using the measurement values (R0 to Rn) and the temperature values (T0 to Tn) stored in the memory 8 by the measuring processes (step S9).

(Temperature Coefficient TC)

Specifically, the CPU 9 calculates the temperature coefficient TCn using the below-mentioned formula (1). The below-mentioned formula (1) is a formula for calculating the gradient of the regression line.

$$TCn\ (\%/° C.) = \sum_{i=1}^{n}(T_i - \overline{T})(R_i - \overline{R})/R_0\sum_{i=1}^{n}(T_i - \overline{T})^2 \quad (1)$$

Here, $\overline{T}$ and $\overline{R}$ each represent the average value of the setting temperature and the average value of the resistance.

The number of times n of the temperature setting and the resistance measurement is preferably large, since this improves the reliability of the measurement data. The setting range of the temperatures T0 to Tn is preferably wide, and within a range that does not cause deterioration of the TMR element.

As shown in FIG. 2, the CPU 9 determines the quality of the tunnel barrier layer 15 of the TMR element (pin hole state) (step S10). The specific determining criteria and the principle of the quality determination (evaluation) method for the tunnel barrier layer 15 will be explained with reference to FIGS. 3 to 10.

Figure 3:
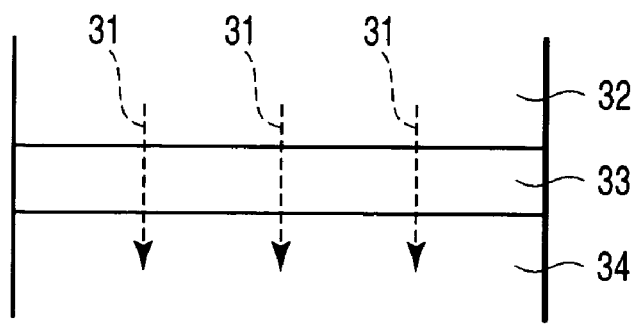
FIG. 3 is a diagram for explaining a quality testing method for the TMR element of the embodiment.
Figure 4:
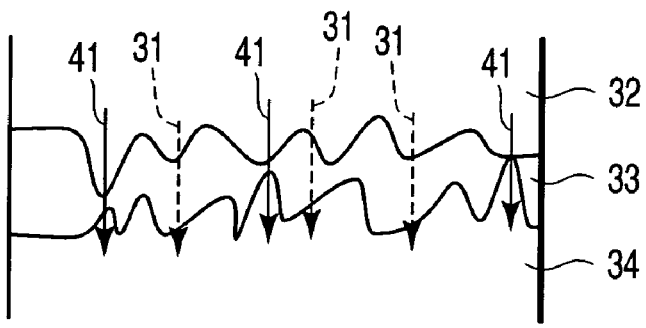
FIG. 4 is a diagram for explaining a quality testing method for the TMR element of the embodiment.

FIGS. 3 and 4 are conceptual diagrams for explaining the state of the quality change of the TMR element.

As shown in FIG. 3, the TMR element having a multiple layer structure comprising the free layer 32, the tunnel barrier layer 33 and the pinned layer 34 has the resistance value R reduced according to the circumferential temperature rise. The reference numeral 31 denotes the tunnel electric current.

According to the reduction of the resistance value R, the temperature coefficient TC becomes "TC<0". In this state, as shown in FIG. 4, the interface of the tunnel barrier layer 33 is disturbed so as to cause the metal contact of the free layer 32 and the pinned layer 34 provided above and below. The local metal contact part is referred to as the pin hole.

In the case such a pin hole is formed in the tunnel barrier layer 33, since a parallel circuit of the tunnel electric current 31 and the pin hole electric current 41 is formed, the resistance value tends to be lower as a whole. Moreover, since the pin hole part is a metal, the resistance value is increased according to the temperature rise. Therefore, the temperature coefficient TC becomes "TC>0".

Figure 5:
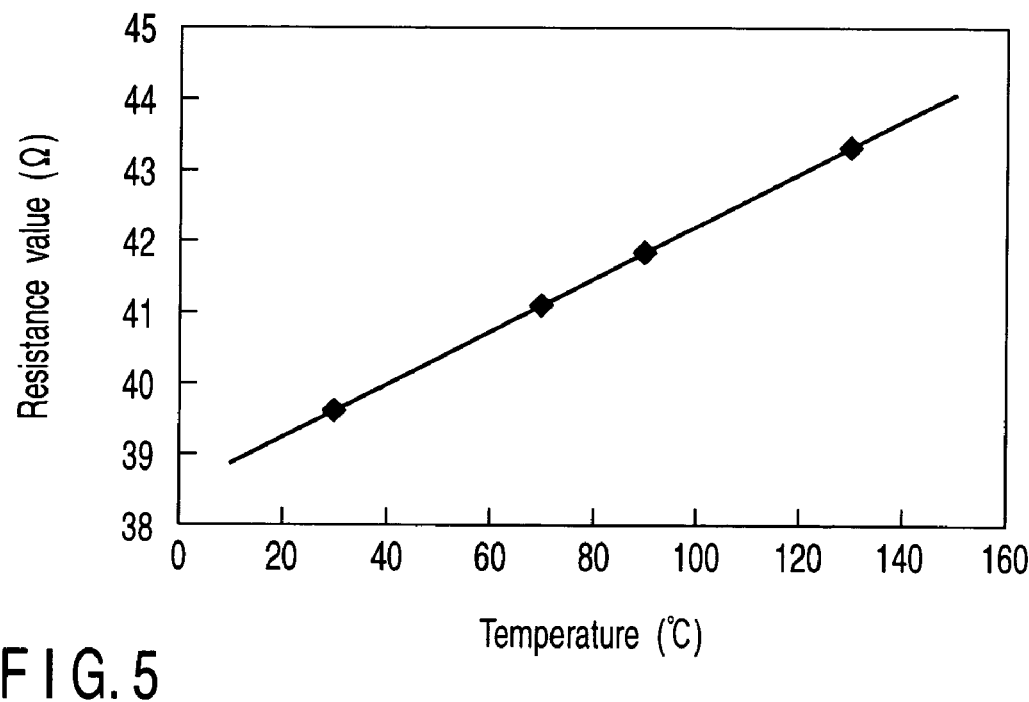
FIG. 5 is a graph showing a temperature dependency of a resistance value of a GMR element of the embodiment.

FIG. 5 is a characteristic figure showing the temperature dependency of the resistance value of the GMR element having the same metal characteristic as that of the pin hole part. As shown in FIG. 4, in the case the pin holes are increased in the tunnel barrier layer 33, the positive temperature coefficient TC characteristic of the pin hole parts offset the negative TC characteristic of the tunnel barrier layer 33. The temperature coefficient TC shifts from a negative value to a positive value. Therefore, the presence ratio of the pin holes generated in the tunnel barrier layer 33 can be presumed from the tendency of the temperature coefficient TC.

Figure 6:
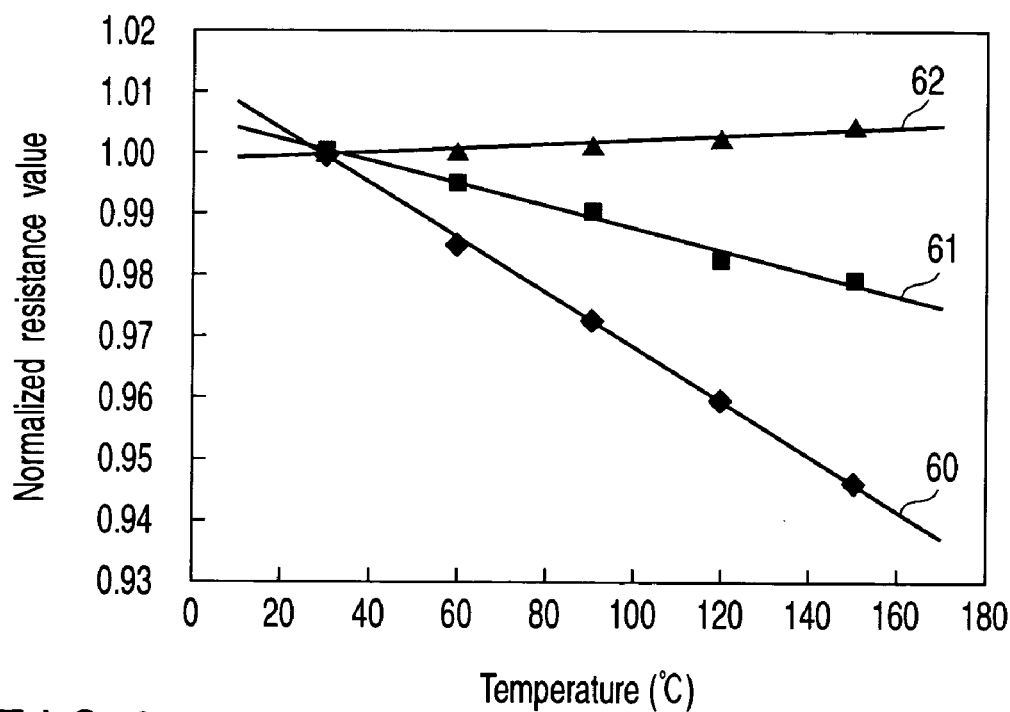
FIG. 6 is a graph showing an example of a result of measuring the resistance value change with respect to the temperature of the TMR element of the embodiment.

FIG. 6 shows an example of the result of measurement of the resistance value change with respect to the TMR element temperature (temperature dependency of the resistance) in the testing method of this embodiment. In FIG. 6, the abscissa axis represents the temperature T, and the ordinate axis represents the resistance value standardized with respect to the initial resistance value R0 at 30° C.

In FIG. 6, each of the temperature dependency characteristics of a sample 60 in the case of a 345 ohm initial resistance value R0, a sample 61 in the case of a 251 ohm initial resistance value R0, and a sample 62 in the case of a 123 ohm initial resistance value R0 are specific examples. The measurement conditions here are a 0.2 mA initial electric current I0, a 30° C. initial temperature T0 and setting temperatures of 60, 90, 120 and 150° C.

As shown in FIG. 6, the gradients of the straight lines of the graph corresponding to the temperature coefficient TC become steeper with a smaller initial resistance value R0 in the order of the samples 60 to 62. Therefore, the sample 60 is close to the complete tunnel barrier layer 33 as shown in FIG. 3. In contrast, in the case of the samples 61, 62, the pin hole ratio in the tunnel barrier layer is increased relatively so as to be close to the state as shown in FIG. 4.

Figure 7:
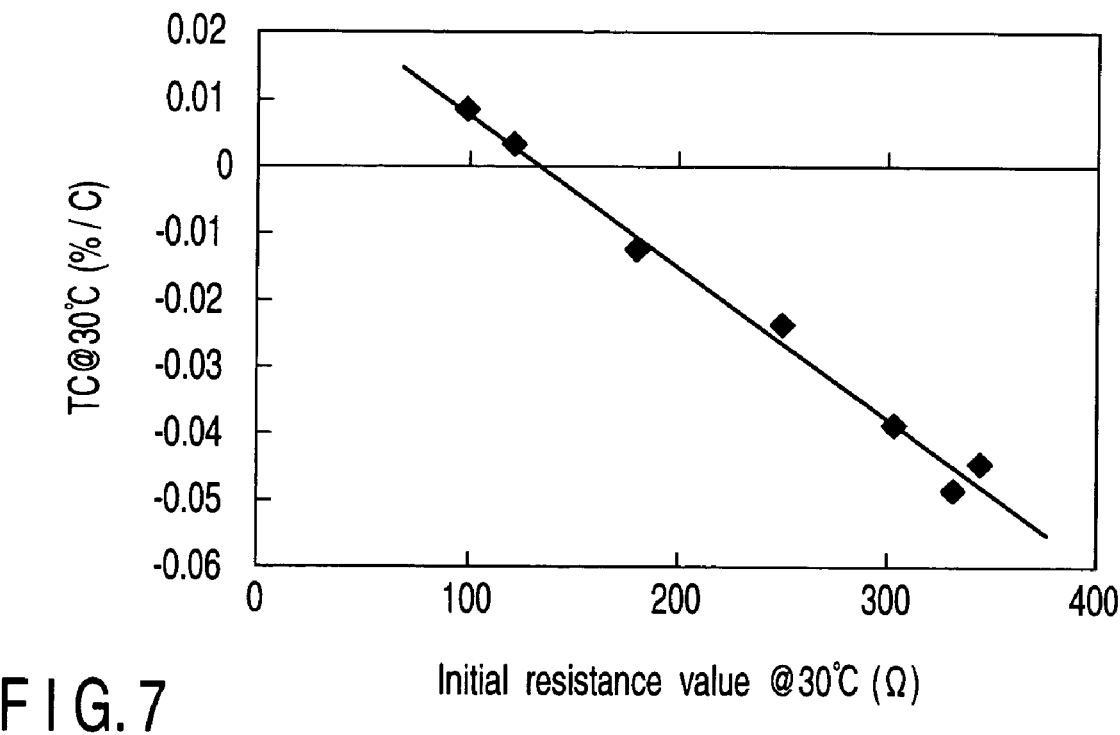
FIG. 7 is a graph showing an example of a calculation result of a temperature coefficient TC with respect to an initial resistance value of the embodiment.

FIG. 7 shows an example of the result of the temperature coefficient TC calculated by the above-mentioned formula (1) with respect to the initial resistance value R0. As shown in FIG. 7, with a smaller initial resistance value, the temperature coefficient becomes closer from the negative value to the positive value. From this result, it is confirmed that the temperature coefficient TC is an indicator accurately representing the pin hole ratio in the tunnel barrier layer.

(Breakdown Voltage BDV)

Next, a method of testing the durability of the TMR element non destructively according to the breakdown voltage BDV will be explained.

The CPU 9 calculates (presumes) the breakdown voltage from the calculated temperature coefficient TC. As mentioned above, the breakdown voltage denotes the critical voltage of causing the element destruction at the time of applying the stress electric current Ib to the TMR element stepwise. It is confirmed that the breakdown voltage BDV becomes lower in the case a pin hole is present in the tunnel barrier layer.

Figure 8:
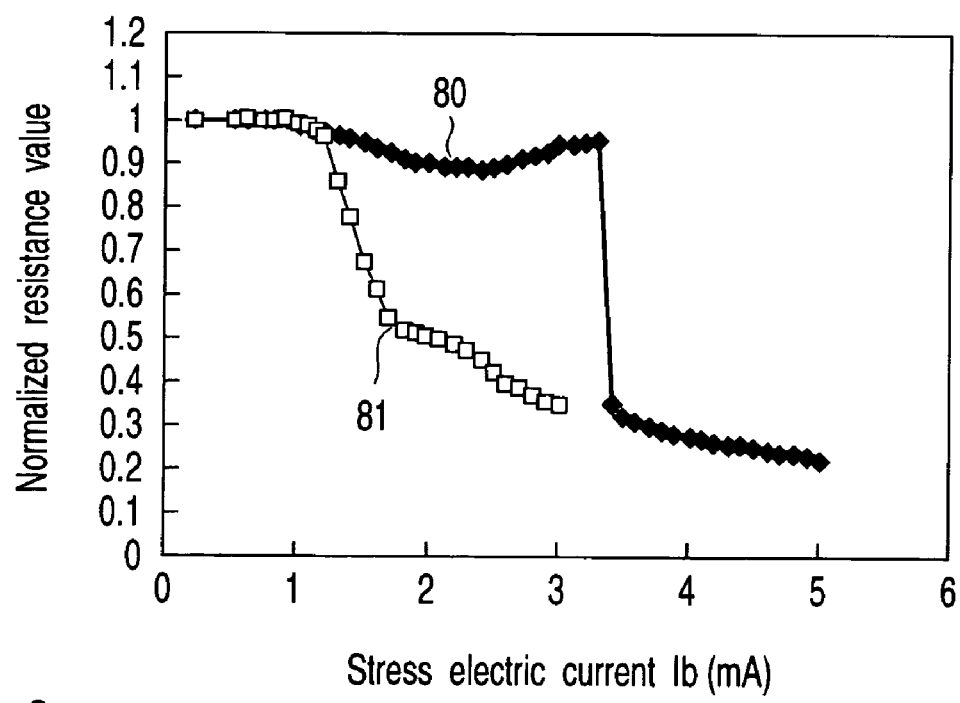
FIG. 8 is a graph showing an example of a result of a breakdown test of the TMR element of the embodiment.

FIG. 8 shows an example of the testing result of the breakdown test of the TMR element. In FIG. 8, the abscissa axis represents the stress electric current Ib, and the ordinate axis represents the resistance value standardized with respect to the initial resistance value. The resistance value shown here is a value measured after the application of the stress electric current Ib with the measurement conditions of a 30° C. setting temperature and a 0.2 mA initial electric current I0.

As shown in FIG. 8, as to a sample 80, the resistance value R is reduced moderately according to the increase of the stress electric current Ib and it is reduced drastically in the vicinity of the 3.3 mA stress electric current Ib. As to a sample 81, the resistance value starts to be reduced from the 1.3 mA stress electric current Ib and it is reduced stepwisely according to the increase of the stress electric current Ib.

In FIG. 8, the characteristics of the samples 80, 81 are determined by the pin hole presence ratio in the tunnel barrier layer. That is, in the case pin holes are not present or the presence ratio is small in the tunnel barrier layer, the barrier type destruction behavior deteriorates drastically beyond a certain critical voltage (the vicinity of 3.3 mA stress electric current Ib), as in the case of the sample 80.

In contrast, in the case the pin hole ratio in the tunnel barrier layer is large, since the electric current is concentrated in the pin hole parts, the electric current density is increased so as to cause the destruction by Joule heat. Moreover, as the deterioration behavior, the pin holes are enlarged and propagated successively according to the increase of the stress electric current so as to show the tendency of the stepwise TMR element deterioration (resistance reduction) as in the case of the sample 81. Therefore, it is confirmed that the voltage resistance of the tunnel barrier layer (BDV) becomes extremely low in the case the pin hole ratio is large in the tunnel barrier layer.

Figure 9:
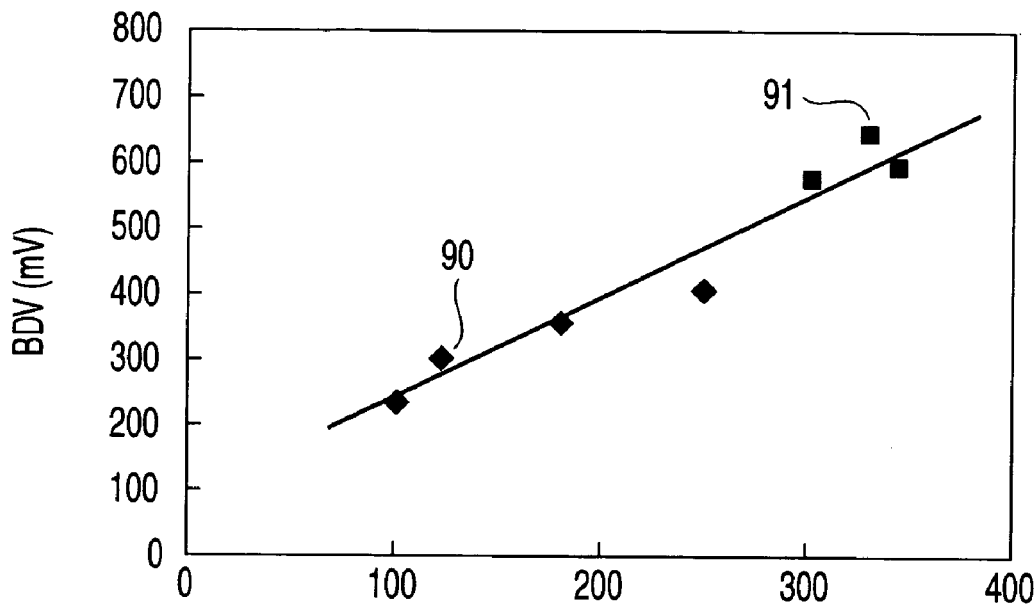
FIG. 9 is a graph showing an example of a breakdown voltage with respect to the initial resistance value of the TMR element of the embodiment.

FIG. 9 shows an example of the breakdown voltage (BDV) with respect to the initial resistance value of the TMR element. In FIG. 9, the abscissa axis represents the initial resistance value, and the ordinate axis represents the breakdown voltage (BDV). It is preferable that the breakdown voltage (BDV) is defined to be a value at the time when the resistance value deteriorates by 15% or more with respect to the initial resistance value.

As mentioned above, if pin holes are not present in the tunnel barrier layer or the presence ratio is small, the barrier type destruction behavior deteriorates drastically beyond a certain critical voltage, as in the case of the sample 80 of FIG. 8 (reference numeral 91). The barrier type destruction 91 denotes the behavior with 50% or more of the maximum deterioration ratio of the resistance value per 0.1 mA at the time of the breakdown. In contrast, since the destruction derived from the pin holes (reference numeral 90) is promoted with a smaller initial resistance, the BDV becomes lower. Here, the sample showing the barrier type destruction indicates a 500 mV or more BDV and a high voltage resistance, thus is excellent in terms of reliability.

Figure 10:
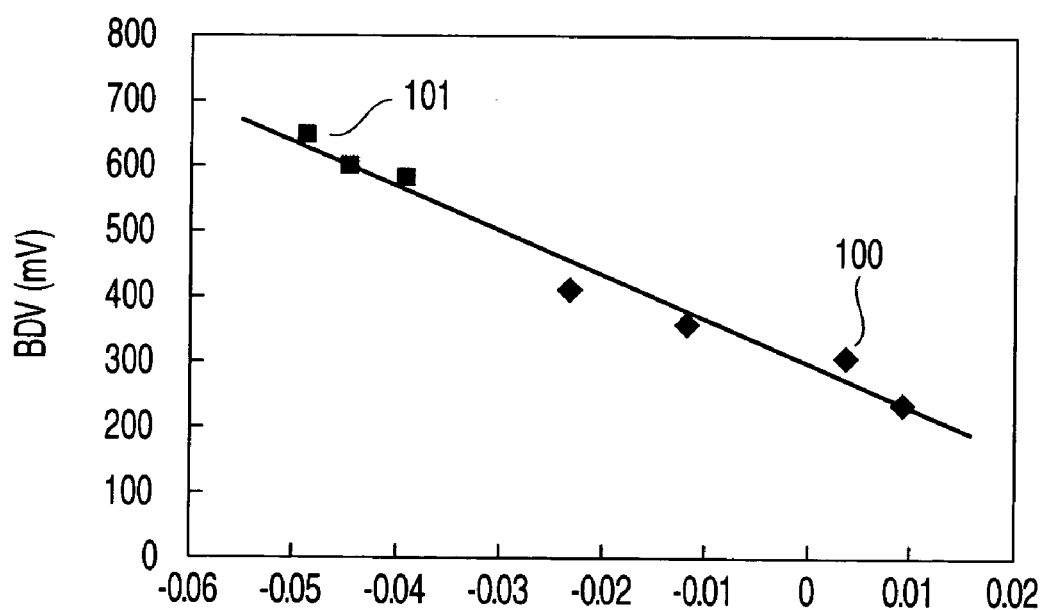
FIG. 10 is a graph showing the relationship between the temperature coefficient TC and the breakdown voltage BDV of the embodiment.

FIG. 10 is a characteristic graph showing the relationship between the temperature coefficient TC and the breakdown voltage BDV (barrier type characteristic 100 and pin hole type characteristic 101).

As shown in FIG. 10, the TC and the BDV have an extremely good correlation. Therefore, merely by measuring the temperature coefficient TC, not only the presence of pin holes can be determined but also the BDV can be predicted (evaluated) without the risk of breaking the TMR element. In this case, the criterion for determining the quality control "pass" level for the tunnel barrier layer is "TC>−0.03%/° C.". Moreover, in the case of "TC>−0.03%/° C.", the tunnel barrier layer can have the durability of "BDV>500 mV".

(Configuration of the Disk Drive)

Figure 12:
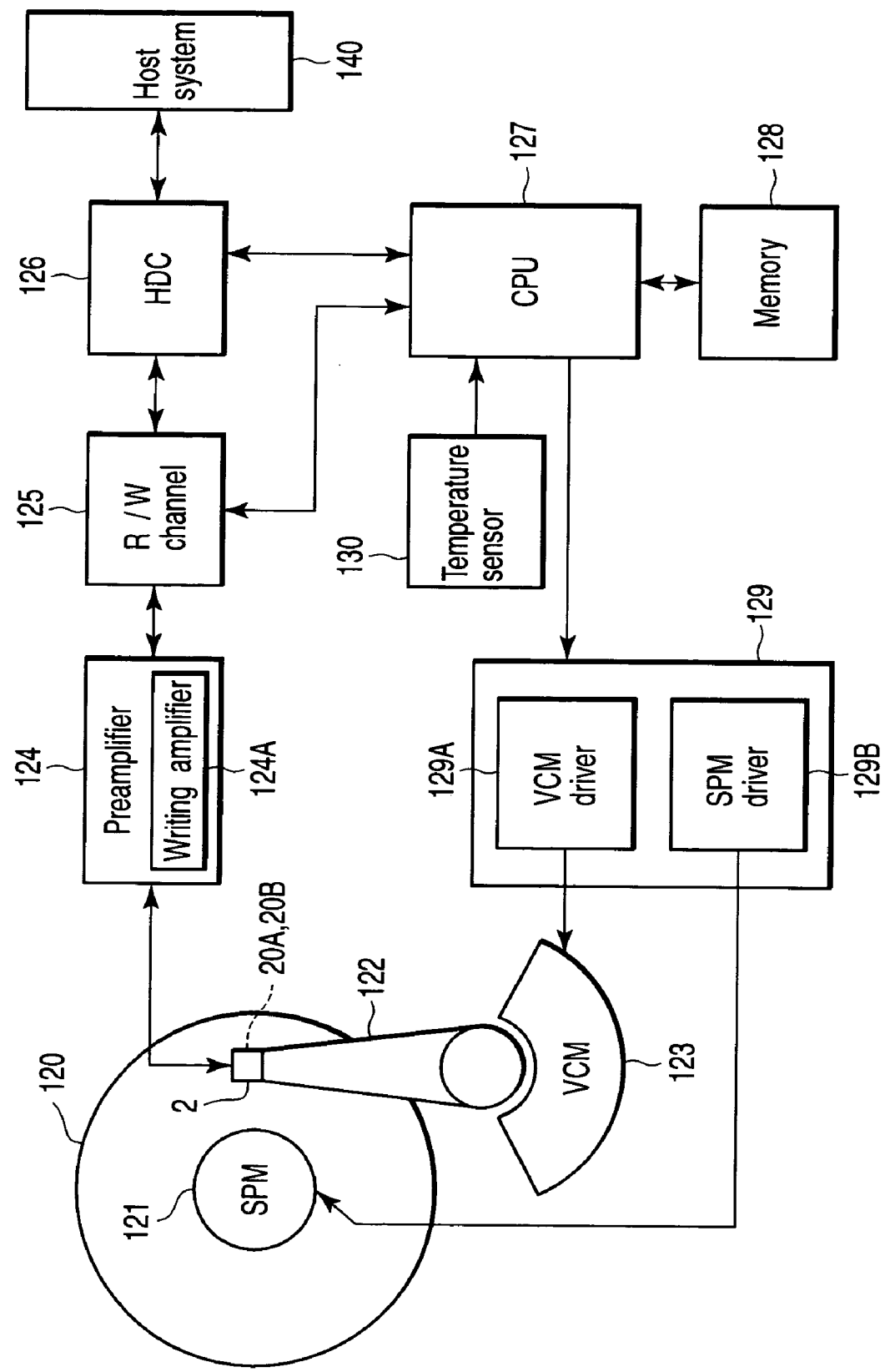
FIG. 12 is a block diagram showing an essential part of a disk drive of the embodiment.

FIG. 12 is a block diagram showing the essential part of the magnetic head 2 with the TMR element of this embodiment mounted as the reading head 20A, and the disk drive storing the micro processor (CPU) 127 having the TMR element testing function.

The disk drive of this embodiment comprises a disk 120 fixed to a spindle motor (SPM) 121, to be rotated at a high speed, and an actuator 122 with the head 2 mounted. The head 2 has the reading head 20A and the writing head 20B mounted.

The actuator 122 is driven rotatably by the driving force of a voice coil motor (VCM) 123 so as to move the head 2 in the disk 120 radium direction. The driving electric current for VCM 123 is supplied from a VCM driver 129A included in a motor driver IC 129. The motor driver 129 including a SPM driver 129B together with the VCM driver 129A is controlled by the CPU 127.

Furthermore, the disk drive comprises a preamplifier circuit 124, a R/W channel 125, a disk controller (HDC) 126, a CPU 127 and a memory 128.

The preamplifier circuit 124 comprises a writing amplifier 124A for supplying the recording electric current to be provided to a coil of the writing head 20B in addition to the reading amplifier for amplifying a reading signal outputted from the reading head 20A.

The R/W channel 125 is a signal processing IC for processing a reading/writing data signal. The HDC 9 has an interface function for a drive and a host system 140 (such as a personal computer or a digital device).

The CPU 127 as the main control device for the drive has the testing function of the TMR element (reading head 20A) of this embodiment. The memory 128 includes a RAM, a ROM, and the like in addition to a flash memory (EEPROM) 110 as a nonvolatile memory for storing the program and data necessary for the control and the testing process of the CPU 127. Furthermore, the drive has a temperature sensor 130 for sensing the temperature in the drive. The CPU 127 monitors the circumferential temperature of the head 2 according to the temperature detection from the temperature sensor 130.

Figure 11:
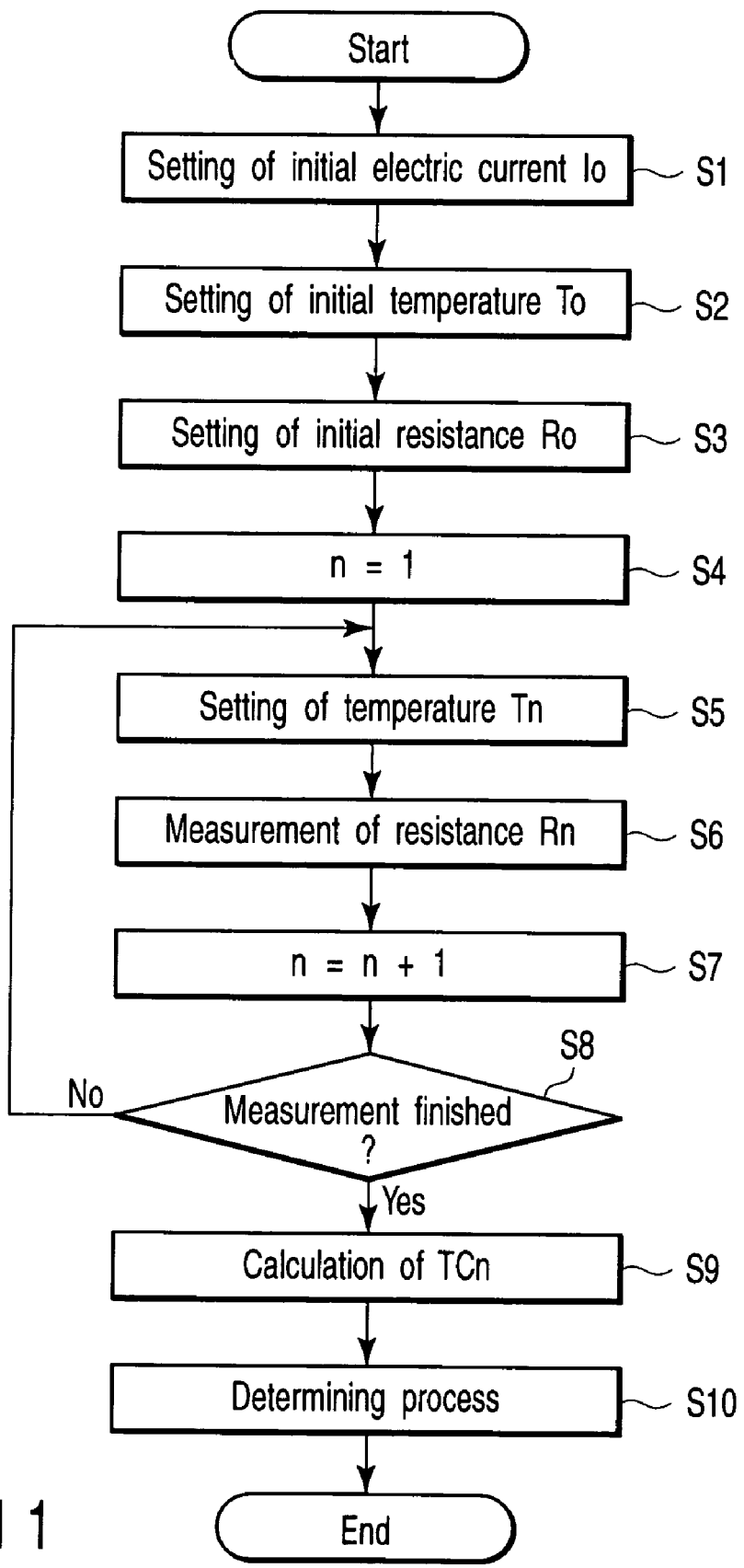
FIG. 11 is a flow chart for explaining a procedure of a test process of the TMR element of the embodiment.

The CPU 127 basically executes the determination (evaluation) of the temperature coefficient TC and the breakdown voltage BDV of the TMR element of the reading head 20A according to the testing process procedure shown in FIG. 11. As the element resistance measuring unit 6, the CPU 127 utilizes a reading signal outputted from a reading amplifier included in the preamplifier circuit 124.

Moreover, as the bias electric current control unit 5, the CPU 127 utilizes a bias electric current control circuit included in the preamplifier 124. That is, according to the control by the CPU 127, the preamplifier 124 supplies a bias electric current for the measurement (electric current 19 in FIG. 2) to the TMR element. The CPU 127 measures the resistance value of the TMR element (in the narrower meaning, the resistance value of the tunnel barrier layer 15) utilizing the reading signal outputted from the reading amplifier.

Moreover, as the temperature control unit 7, the CPU 127 controls the circumferential temperature of the reading head 20A (TMR element) by providing the recording electric current to the coil of the writing head 20B by controlling the writing amplifier 124A.

The disk drive need not store all the configurations for realizing the testing function, and the CPU may execute only the testing process. In this case, the configuration for providing the device corresponding to the element resistance measuring unit 6 and the temperature control unit 7 outside the disk drive and executing the resistance measurement and the temperature setting of the TMR element outside the disk drive may be adopted. The device corresponding to the temperature control unit 7 refers to a heater, a laser, a constant temperature vessel, or the like. In the case of a testing method by such a disk drive, the special testing device as shown in FIG. 1 may be omitted.

As heretofore mentioned, according to the head testing method of this embodiment, presence of pin holes (defect part) in the tunnel barrier layer can be tested by a non destructive inspection by calculating or measuring the temperature coefficient TC and the breakdown voltage BDV of the TMR element comprising the reading head.

In other words, the state of the pin holes (pin hole ratio, or the like) generated in the tunnel barrier layer included in the TMR element can be tested by a non destructive test method.

Therefore, the quality of the TMR element can be tested efficiently and accurately so that a TMR element with a quality defect can be screened preliminarily. Furthermore, the testing method of this embodiment can be introduced to a shipping testing process of a TMR element as a product or a disk drive with the TMR element mounted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
a magnetic head which has a reading head using a tunneling magnetoresistive effect element (TMR element) and a writing head for generating a recording magnetic field according to a recording electric current provided in a coil, and which executes a data reading operation or writing operation to a disk medium;
a controller to control a circumferential temperature of the TMR element by controlling the electric current to be supplied to the coil of the writing head at the time of a testing process for calculating a temperature coefficient with respect to a resistance value of the TMR element;
a measuring unit which measures the resistance value of the TMR element by providing an electric current to the TMR element;
a unit which calculates the temperature coefficient with respect to the resistance value of the TMR element based on the resistance value of the circumferential temperature of the element; and
a determining unit which determines a pin hole state of a tunnel barrier layer included in the TMR element based on the temperature coefficient.

2. A disk drive comprising:
a magnetic head which has a reading head using a tunneling magnetoresistive effect element (TMR element) and a writing head of generating a recording magnetic field according to a recording electric current provided in a coil, and which executes a data reading operation or writing operation to a disk medium;
a controller to control a circumferential temperature of the TMR element by controlling the electric current to be supplied to the coil of the writing head at the time of a testing process for calculating the temperature coefficient with respect to a resistance value of the TMR element;
a measuring unit which measures the resistance value of the TMR element by providing an electric current to the TMR element;
a unit which calculate the temperature coefficient with respect to the resistance value of the TMR element based on the resistance value of the circumferential temperature of the TMR element;
a determining unit which determines a pin hole state of a tunnel barrier layer included in the TMR element based on the temperature coefficient; and
a unit which calculates the breakdown voltage of the TMR element according to the temperature coefficient,
wherein the determining unit evaluates the characteristics of the tunnel barrier layer based on the breakdown voltage.

* * * * *